United States Patent
Uno et al.

[11] 3,893,141
[45] July 1, 1975

[54] SINGLE LENS REFLEX CAMERA MIRROR AND DIAPHRAGM ADJUSTING MECHANISM

[75] Inventors: Naoyuki Uno; Namura Katsuhiko, both of Kawagoe, Japan

[73] Assignee: Asahi Kogaku Kogyo Kabushiki Kaisha, Tokyo, Japan

[22] Filed: Sept. 12, 1973

[21] Appl. No.: 396,657

[30] Foreign Application Priority Data
Sept. 21, 1972 Japan .......................... 47-108967

[52] U.S. Cl. .............................. 354/156; 354/272
[51] Int. Cl.² ..................... G03B 19/12; G03B 9/02
[58] Field of Search .......... 95/42 R, 64 B; 354/156, 354/270, 271, 272, 274

[56] References Cited
UNITED STATES PATENTS

| | | | |
|---|---|---|---|
| 3,442,192 | 5/1969 | Sato | 95/64 B X |
| 3,640,202 | 2/1972 | Nomura | 95/64 B X |
| 3,680,458 | 8/1972 | Nomura | 95/42 |
| 3,731,609 | 5/1973 | Kobayashi | 95/42 |

Primary Examiner—Samuel S. Matthews
Assistant Examiner—Alan Mathews
Attorney, Agent, or Firm—Wolder & Gross

[57] ABSTRACT

A single lens reflex camera including a mirror swingable between retracted photographing and advanced viewing positions and a preset diaphragm moveable between fully open and reduced aperture positions, includes a cam manually rotatable in opposite directions from a normal position to first and second positions. A first lever train engages the mirror at its output and defines a follower at its input engaging the cam and a second lever train controls at its output the diaphgram aperture condition and defines a follower at its input engaging the cam. Rotation of the cam by a knob to its first position retracts the mirror and effects the diaphragm aperture reduction and rotation of the cam to its second position reduces the diaphragm aperture and leaves the mirror in its advanced position.

3 Claims, 1 Drawing Figure

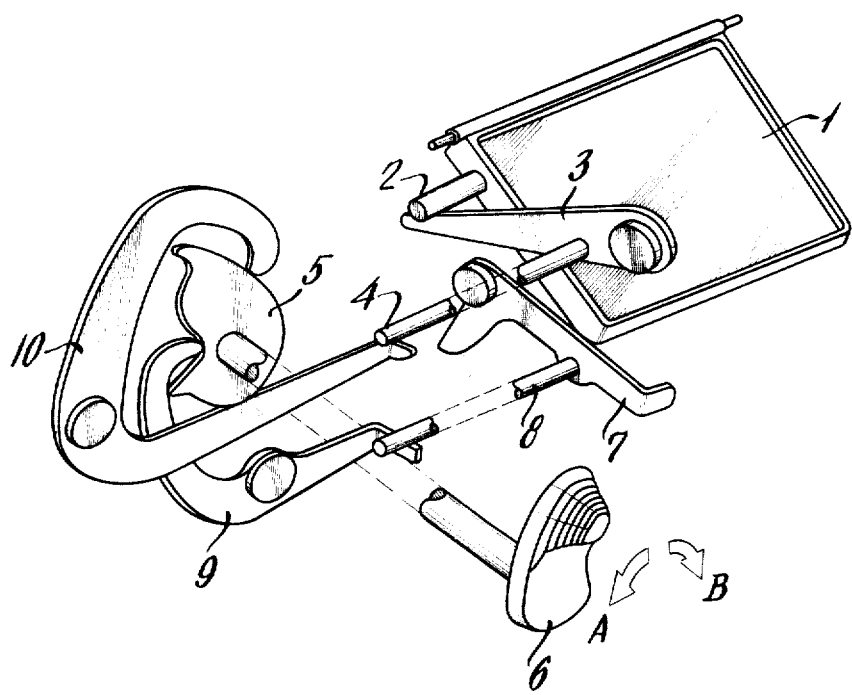

SINGLE LENS REFLEX CAMERA MIRROR AND DIAPHRAGM ADJUSTING MECHANISM

BACKGROUND OF THE INVENTION

The present invention relates generally to improvements in single lens reflex cameras, and it relates more particularly to an improved mechanism for selectively retracting the camera mirror and for shifting the objective diaphragm to its reduced preset set aperture.

It is highly desirable in many situations to be capable of locking the mirror in a single lens reflex camera in its retracted or photographing position independently of the photographing cycle, and it is likewise desirable to reduce the camera objective diaphragm aperture to its preset condition likewise independently of the photographing exposure operation. These adjustments have heretofore been accomplished by independently manually controlled separate members, such as externally accessible knobs or finger pieces, but such mechanisms possess numerous drawbacks and disadvantages. They are awkward arrangements which are inconvenient and often confusing to use, and otherwise leave much to be desired.

SUMMARY OF THE INVENTION

It is a principal object of the present invention to provide an improved single lens reflex camera.

Another object of the present invention is to provide an improved mechanism for controlling the position of the mirror and the condition of the diaphragm aperture in a single lens reflex camera independently of the exposure cycle.

Still another object of the present invention is to provide an improved mechanism of the above nature characterized by its reliability, simplicity, ruggedness, ease and convenience of operation, and its high versatility and adaptability.

The above and other objects of the present invention will become apparent from a reading of the following description taken in conjunction with the accompanying drawing which illustrates a preferred embodiment thereof.

In a sense, the present invention contemplates the provision of, in a single lens reflex camera including a mirror moveable between an advanced viewing position and a retracted photographing position, and a diaphragm moveable between a retracted aperture open condition and a reduced aperture condition, an actuating member selectively moveable from a normal position to respective first and second positions, first means responsive to the movement of the actuating member to its first position for retracting the mirror, and second means responsive to the movement of the actuating member to its second position for shifting the diaphragm to its reduced aperture condition. Advantageously, the movement of the actuating member to its first position shifts the diaphragm to its reduced aperture condition simultaneously with the retraction of the mirror.

In the preferred form of the improved mechanism, the actuating member includes a cam rotatable in opposite directions to its first and second positions by an externally accessible finger piece, and the first means includes a swingable lever having a follower defining follower first end engaging the cam and a second end engaging a mirror retracting swingable arm and the second means likewise includes a swingable lever having a follower defining first end engaging the cam and a second end engaging an aperture closing swingable arm. The cam is so shaped that when it is rotated in one direction to its first position, it retracts the mirror and reduces the diaphragm aperture, and when it is rotated in an opposite direction to its second position, it only reduces the diaphragm aperture.

The improved mechanism is simple, rugged and reliable, and is easy and convenient to use and obviates any confusion and error.

BRIEF DESCRIPTION OF THE DRAWING

The FIGURE of the drawing is a perspective view of a preferred embodiment of the present invention illustrated in its normal deactuated condition.

DESCRIPTION OF THE PREFERRED EMBODIMENT

Referring now to the drawing which illustrates a preferred embodiment of the present invention as applied to a single lens reflex camera of known or conventional construction, the reference numeral 1 generally designates a frame supported mirror, advantageously of the quick return type, which is swingable between an advanced lowered position which permits viewing through the camera objective lens and a retracted raised position, which permits exposure of the film, the mirror motivation attendant to an exposure cycle being effected in the known manner. A pin 2 projects from the frame of mirror 1 parallel to its swing axis and is engaged at its under face by the free end of an arm 3 pivotally supported at its opposite end so that clockwise rotation of arm 3, as viewed in the drawing, effects the raising or retraction of mirror 1. Projecting transversely from the arm 3 intermediate its ends is a lever follower pin 4.

An actuating cam 5 having a peripheral cam surface whose configuration will be hereinafter described, is located within the camera body and is mounted on the inner end of and rotatable with a shaft which projects through the front wall of the camera body, and has affixed at its front end an externally accessible finger piece 6 which may be rocked in a clockwise direction as indicated by arrow B to a first position, and in a counter clockwise direction as indicated by arrow A, to a second position, from the normal intermediate position of the fingerpiece to correspondingly rock the cam 5.

A second arm 7 is swingably supported at its inner end and is operably associated at its outer end in the known manner with the automatic preset diaphragm of the camera objective, so that the raising of the free end of lever 7 with its counter clockwise swinging effects the reducing of the diapahragm aperture to its reduced preset value or opening. A lever follower pin 8 projects transversely from lever 7.

An aperture controlling angulated lever 9 swingably pivotly supported proximate its elbow lies in the plane of cam 5 and includes a hooked cam follower, first end slideably engaging the cam 5 and an opposite second end terminating in a transverse finger underlying the pin 8, so that counter clockwise rotation of lever 9 effects the counter clockwise rotation of arm 7. A mirror controlling angulated lever 10 swingably pivotly supported proximate its elbow likewise lies in the plane of cam 5, and includes a cam follower first end slideably engaging the cam 5 at a point spaced from the point of engagement by lever 9, and an opposite second end terminating in a transverse finger so that counter clockwise rotation of lever 10 effects the clockwise rotation of arm 3.

The peripheral cam edge of cam 5 includes a valley section between opposite raised sections engaged by the follower end of lever 9 when the cam 5 and finger piece 6 are in their normal position and when these are rotated counter clockwise or clockwise to their first and second positions respectively, the lever 9 is rotated counter clockwise. The peripheral cam edge of cam 5 also includes a raised portion which terminates at its bottom or base in an arcuate portion concentric with the axis of the cam, the follower end of lever 10 engaging the arcuate portion of the cam edge when finger piece 6 is in its normal position. When the finger piece 6 and cam 5 are rotated clockwise to their first position in the direction of arrow B, the follower end of lever 10 follows the cam edge to its raised portion to rotate the lever 10 counter clockwise. On the other hand, when the finger piece and cam are rotated counter clockwise to their second position, the cam follower of lever 10 rides along the cam edge arcuate portion so that the lever 10 remains stationary.

The operation of the improved mechanism is clear from the above. When the finger piece 6 is in its intermediate or normal neutral position, arm 3 and arm 7 are in counter clockwise and clockwise positions respectively, so that the mirror 1 is in its lowered position and the diaphragm is fully open. When finger piece 6 is swung clockwise to its first position arms 3 and 7 are swung clockwise and counter clockwise respectively to raise the mirror 1 and stop down the objective diaphragm. On the other hand, when the finger piece 6 is swung counter clockwise to its second position, arm 3 is unactuated to leave the mirror 1 in its lowered position and arm 7 is swung counter clockwise to stop down the objective diaphragm. The return of finger piece 6 to its neutral intermediate position return the arms 3 and 7 to their initial normal positions.

The improved mechanism is reliable and simple, employing a single operating element which is moveable in opposite directions to effect different functions in the desired relationship.

While there has been described and illustrated a preferred embodiment of the present invention, it is apparent that numerous alterations, omissions and additions may be made without departing from the spirit thereof.

We claim:

1. In a single lens reflex camera including a mirror moveable between an advanced viewing position and a retracted photographing position and a diaphragm moveable between a retracted aperture open condition and an advanced reduced aperture condition, a cam member manually rotatable from an intermediate position in opposite directions to opposite first and second positions and having a first section including successive raised and depressed portion and a second section including an intermediate depressed portion and raised portions on opposite sides of said depressed portion, first means including a first arm operatively engageable with said mirror and swingable between mirror advanced and retracted positions and a lever having a first end operatively engageable with said first arm and a second end defining a first follower engaging with said cam member first section for advancing and retracting said mirror in response to said follower engaging alternate of said cam member first section depressed and raised portions, and second means including a second arm swingable between a diaphragm open aperture and reduced aperture positions and a second lever having a first end operatively engageable with said second arm and a second end defining a second follower engaging said cam member second section for positioning said diaphragm in its retracted and advanced aperture positions in response to said second follower alternatively engaging said cam member second section depressed and raised portions.

2. The camera of claim 1 wherein rotation of said cam toward either of said first and second positions from its normal position swings said second arm in a common diaphragm aperture reducing direction.

3. The camera of claim 2 wherein said cam is disposed within said camera and including a shaft projecting axially from said cam and terminating in a finger piece accessible at the exterior of said camera.

* * * * *

UNITED STATES PATENT OFFICE
CERTIFICATE OF CORRECTION

PATENT NO. : 3,893,141
DATED : July 1, 1975
INVENTOR(S) : NAOYUKI UNO and KATSUHIKO NOMURA It is certified that error appears in the above-identified patent and that said Letters Patent are hereby corrected as shown below:

After (75) Inventors:
change NAMURA KATSUHIKO , to read
--KATSUHIKO NOMURA,--

*Signed and Sealed this*

*fourteenth* Day of *October 1975*

[SEAL]

Attest:

RUTH C. MASON
*Attesting Officer*

C. MARSHALL DANN
*Commissioner of Patents and Trademarks*